(12) United States Patent
Schumann et al.

(10) Patent No.: US 10,449,826 B2
(45) Date of Patent: Oct. 22, 2019

(54) DEVICE FOR CONTROLLING THE TEMPERATURE OF A BATTERY AND OF A VEHICLE INTERIOR, METHOD FOR CONDITIONING THE TEMPERATURE OF A BATTERY AND OF A VEHICLE INTERIOR WITH SUCH A DEVICE FOR CONTROLLING TEMPERATURE, AND USE OF SUCH A DEVICE FOR CONTROLLING TEMPERATURE

(71) Applicant: Robert Bosch GmbH, Stuttgart (DE)

(72) Inventors: Bernd Schumann, Rutesheim (DE); Andreas Letsch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 615 days.

(21) Appl. No.: 15/135,760

(22) Filed: Apr. 22, 2016

(65) Prior Publication Data

US 2016/0325598 A1    Nov. 10, 2016

(30) Foreign Application Priority Data

May 6, 2015   (DE) .................. 10 2015 208 438

(51) Int. Cl.
*B60H 1/00* (2006.01)
*H01M 10/625* (2014.01)
(Continued)

(52) U.S. Cl.
CPC ...... *B60H 1/00278* (2013.01); *H01M 10/625* (2015.04); *H01M 10/655* (2015.04);
(Continued)

(58) Field of Classification Search
CPC .......... B60H 1/00278; B60H 2001/003; B60H 1/00392; H01M 10/663; H01M 10/6563;
(Continued)

(56) References Cited

U.S. PATENT DOCUMENTS 5,490,572 A * 2/1996 Tajiri ................. B60H 1/00278
                                                    180/65.1
5,876,277 A * 3/1999 Uemura ............. B60H 1/00849
                                                    454/139
(Continued)

FOREIGN PATENT DOCUMENTS

DE        19730678 A1    1/1999
DE     102007037919 A1    3/2008
(Continued)

*Primary Examiner* — Henry T Crenshaw
(74) *Attorney, Agent, or Firm* — Norton Rose Fulbright US LLP; Gerard Messina

(57) ABSTRACT

A temperature control device for a battery and for a vehicle interior, having a first heat exchanger and having a second heat exchanger that are thermally coupled, the second heat exchanger being thermally coupled to the battery, and the first heat exchanger to a temperature control chamber that has a downstream segment that is thermally coupled to the vehicle interior and has a first upstream segment and a second upstream segment, the first upstream segment being thermally coupled to the vehicle interior and the second upstream segment to a surrounding environment of the vehicle, the first heat exchanger being capable of being thermally coupled alternately to the first upstream segment or to the second upstream segment.

16 Claims, 1 Drawing Sheet

(51) Int. Cl.
*H01M 10/6563* (2014.01)
*H01M 10/655* (2014.01)
*H01M 10/663* (2014.01)
*H01M 10/6565* (2014.01)

(52) U.S. Cl.
CPC ..... *H01M 10/6563* (2015.04); *H01M 10/663* (2015.04); *B60H 1/00392* (2013.01); *B60H 2001/003* (2013.01); *H01M 10/6565* (2015.04); *H01M 2220/20* (2013.01)

(58) Field of Classification Search
CPC ............. H01M 10/625; H01M 10/655; H01M 10/6565; H01M 2220/20
USPC ........................................................ 165/287
See application file for complete search history.

(56) References Cited

U.S. PATENT DOCUMENTS

| | | | | |
|---|---|---|---|---|
| 6,138,466 | A * | 10/2000 | Lake | B60H 1/00278 |
| | | | | 429/62 |
| 2010/0209774 | A1* | 8/2010 | Minami | H01M 4/366 |
| | | | | 429/218.1 |
| 2014/0033761 | A1* | 2/2014 | Kawakami | B60H 1/00278 |
| | | | | 62/498 |
| 2014/0075981 | A1* | 3/2014 | Uchida | B60H 1/00278 |
| | | | | 62/498 |
| 2014/0209070 | A1* | 7/2014 | Gleeson | F02M 21/06 |
| | | | | 123/543 |
| 2014/0272600 | A1* | 9/2014 | Bouchet | C08J 5/2243 |
| | | | | 429/305 |
| 2015/0034272 | A1* | 2/2015 | Saab | B60H 1/00278 |
| | | | | 165/43 |
| 2015/0041553 | A1* | 2/2015 | Taniguchi | B60H 1/00035 |
| | | | | 237/12.3 A |
| 2015/0224849 | A1* | 8/2015 | Takeuchi | F25B 5/00 |
| | | | | 62/243 |
| 2015/0295285 | A1* | 10/2015 | Takeuchi | F25B 5/00 |
| | | | | 62/498 |
| 2015/0380785 | A1* | 12/2015 | Takeuchi | H01M 10/663 |
| | | | | 429/62 |

FOREIGN PATENT DOCUMENTS

| | | |
|---|---|---|
| DE | 102009019607 A1 | 11/2010 |
| DE | 102011076897 A1 | 5/2012 |
| EP | 2357102 A1 | 8/2011 |

* cited by examiner

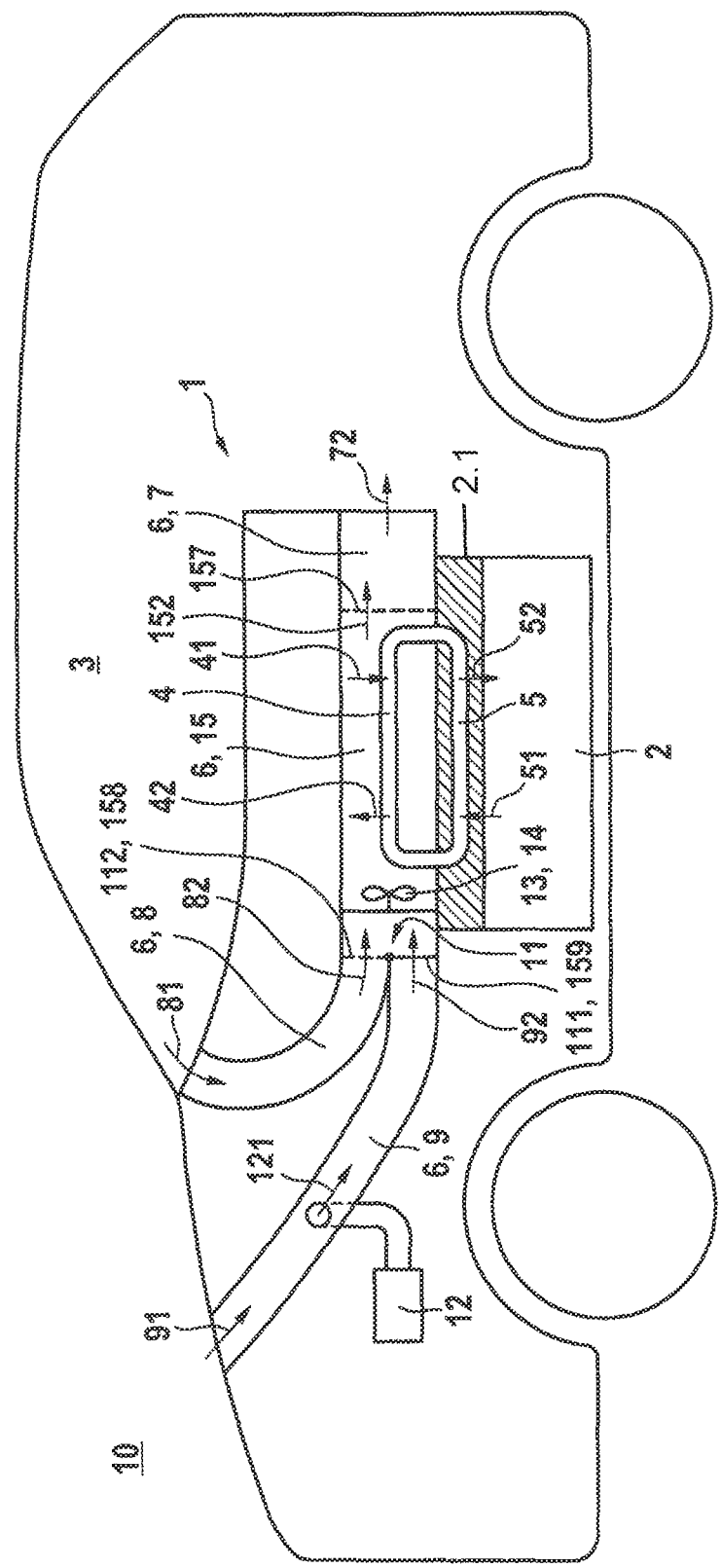

DEVICE FOR CONTROLLING THE TEMPERATURE OF A BATTERY AND OF A VEHICLE INTERIOR, METHOD FOR CONDITIONING THE TEMPERATURE OF A BATTERY AND OF A VEHICLE INTERIOR WITH SUCH A DEVICE FOR CONTROLLING TEMPERATURE, AND USE OF SUCH A DEVICE FOR CONTROLLING TEMPERATURE

FIELD OF THE INVENTION

The present invention is based on a device for controlling temperature, or a method for operating said device, of the type indicated herein.

BACKGROUND INFORMATION

Patent document EP 2 357 102 A1 discusses a heating system for an electrically drivable vehicle having an electrical drive component, an electrical energy storage device, and a cooling circuit. The cooling circuit has a circulating coolant for absorbing waste heat from the electrical drive component. In addition, the cooling circuit has a first heat exchanger for exchanging heat between the cooling circuit and the surrounding air. In addition, a thermoelectrical heat pump element is coupled to the cooling circuit via a second heat exchanger in order to transport heat between the cooling circuit and a passenger area. A further thermoelectrical heat pump element is coupled to the first heat exchanger in order to transport heat between the cooling circuit and the surrounding air.

From DE 10 2011 076 897 A1 and DE 10 2009 019 607 A1, temperature control devices and methods for controlling the temperature of a vehicle interior are also believed to be discussed.

SUMMARY OF THE INVENTION

The device for controlling temperature and the method for controlling the temperature of a battery and a vehicle interior having the features of the independent claims have the advantage that through an alternating coupling of a first heat exchanger to a first upstream segment or to a second upstream segment, the temperature of the vehicle interior and/or of the battery can be controlled based on existing temperature differences between the battery, the vehicle interior, and a surrounding environment of the vehicle.

According to the present invention, a temperature control device for a battery and for a vehicle interior is provided that has a first heat exchanger and a second heat exchanger that are thermally coupled. Here, the second heat exchanger is thermally coupled to the battery. In addition, the first heat exchanger is thermally coupled to a temperature control chamber. The temperature control chamber has a downstream segment that is thermally coupled to the vehicle interior. In addition, the temperature control chamber has a first upstream segment and a second upstream segment. The first upstream segment is thermally coupled to the vehicle interior, and the second upstream segment is thermally coupled to a surrounding environment of the vehicle. The first heat exchanger is capable of being thermally coupled alternately to the first upstream segment or to the second upstream segment.

Through the measures stated in the dependent claims, advantageous developments and improvements of the device indicated in the independent claim, or of the method indicated in a coordinate independent claim, are possible.

In particular, the thermal coupling of the first heat exchanger and the second heat exchanger is realized as a component of a reversible heat pump process. In this way, heat absorbed by the first heat exchanger can be transferred to the second heat exchanger, which then outputs this heat, or heat absorbed by the second heat exchanger can be transferred to the first heat exchanger, which then outputs this heat.

In addition, it is useful if the temperature control chamber has a regulating element. The regulating element is fashioned in such a way that, in a first position of the regulating element, the first heat exchanger is thermally coupled to the first upstream segment, and in a second position of the regulating element the first heat exchanger is thermally coupled to the second upstream segment of the temperature control chamber. In this way it is easily possible to couple the first heat exchanger alternately to the first upstream segment or to the second upstream segment.

In particular, the regulating element is fashioned as a rotatable valve or as a sliding element.

According to a further idea of the present invention, the temperature control chamber has at least one heating element. Thus, the at least one heating element can support the heating of the battery on the basis of an inherent heating when there is a flow of current, due to its internal resistance, and thus provide a faster heating of the battery. In particular, the second upstream segment has the at least one heating element. The heating element may be configured as an electrical heating element or as a heating element that uses fossil fuels.

It is also advantageous if a medium can flow through the temperature control chamber, so that a convective heat transfer, in particular between the first heat exchanger and the medium, supports a controlling of the temperature of the vehicle interior and/or of the battery. In addition, the temperature control chamber can have at least one heat-conducting element that supports the convective heat transfer through heat conduction.

In particular, air can flow through the temperature control chamber from the vehicle interior via the first upstream segment in the direction of the downstream segment. In addition, in particular air from the surrounding environment of the vehicle can flow through the temperature control chamber via the second upstream segment in the direction of the downstream segment. In this way, an efficient controlling of the temperature of the vehicle interior and/or of the battery is possible.

It is also advantageous if the temperature control chamber has a conveying unit. The conveying unit is fashioned in such a way that the medium flows through the temperature control chamber. In this way, the conveying unit can control the volume flow of the medium flowing through the temperature control chamber. In this way, it is possible to influence the controlling of the temperature of the battery and of the vehicle interior.

The conveying unit is fashioned in particular as a blower unit, if air flows through the temperature control chamber.

In addition, the present invention relates to a method for controlling the temperature of a battery and of a vehicle interior having a temperature control device according to the present invention. Here, the first heat exchanger is thermally coupled to the first upstream segment or to the second upstream segment. In this way, temperature controlling of the vehicle interior and/or the battery can take place on the basis of the temperature differences between the battery, the vehicle interior, and a surrounding environment of the vehicle.

In addition, it is useful if the first heat exchanger is thermally coupled to the first upstream segment and the second heat exchanger emits heat in such a way that the vehicle interior is cooled. Through the thermal coupling of the first upstream segment to the vehicle interior, heat is transmitted from the vehicle interior to the first upstream segment. Because the first upstream segment is in addition thermally coupled to the first heat exchanger, this heat is further transmitted to the first heat exchanger, which is thermally coupled to the second heat exchanger. Thus, in order to cool the vehicle interior, heat from the vehicle interior can be transferred to the second heat exchanger, which emits this heat. In addition, it is possible additionally to use this heat to heat the battery.

In addition, it is useful if the first heat exchanger is thermally coupled to the second upstream segment and the second heat exchanger emits heat in such a way that the battery is heated. Through the thermal coupling of the second upstream segment to a surrounding environment of the vehicle, heat is transmitted from the surrounding environment of the vehicle to the second upstream segment. Because the second upstream segment is in addition coupled to the first heat exchanger, this heat is further transferred to the first heat exchanger, which is thermally coupled to the second heat exchanger. Thus, for a heating of the battery, heat can be transferred from the surrounding environment of the vehicle to the second heat exchanger, which is thermally coupled to the battery and which emits this heat to the battery. In this way, the battery can be heated without changing the temperature of the vehicle interior. In addition, at least one heating element can transfer heat indirectly to the first heat exchanger.

In addition, it is also useful if the first heat exchanger is thermally coupled to the first upstream segment and the second heat exchanger absorbs heat in such a way that the vehicle interior is heated. Due to the thermal coupling of the battery to the second heat exchanger, heat can be transferred from the battery to the second heat exchanger. In addition, the second heat exchanger is thermally coupled to the first heat exchanger, so that this heat can be transferred to the first heat exchanger, which is coupled thermally to the temperature control chamber, in particular to the downstream segment of the temperature control chamber. In this way, this heat can be transferred via the temperature control chamber, in particular via the downstream segment of the temperature control chamber, to the vehicle interior. In this way, it is possible to use waste heat from the battery to heat the vehicle interior.

Here, the battery may have battery cells not having liquid electrolytes. In such battery cells, the electrodes and/or the separator are made up of solid electrolytes, such as inorganic or polymer solid electrolytes. An anode may be configured as a lithium-metal anode, for example a silicon-lithium alloy anode. In addition, a cathode may have a material based on nickel, cobalt, manganese, aluminum, or sulfur. In such battery cells, an increase in the operating temperature lowers the internal resistance and accelerates the chemical reactions in particular during charging and discharging of the battery cells.

Thus, it is advantageous to operate the battery at a temperature in a temperature range of from 60° C. to 120° C., and in particular at a temperature in a temperature range of from 65° to 100° C.

Exemplary embodiments of the present invention are shown in the drawing and are explained in more detail in the following description.

BRIEF DESCRIPTION OF THE DRAWING

FIG. 1 shows a specific embodiment of a temperature control device according to the present invention, in a schematic representation.

DETAILED DESCRIPTION

FIG. 1 shows a schematic representation of a specific embodiment of a temperature control device 1 according to the present invention for a battery and for a vehicle interior.

In addition, FIG. 1 shows a battery 2 and a vehicle interior 3.

Temperature control device 1 has a first heat exchanger 4 and a second heat exchanger 5, first heat exchanger 4 and second heat exchanger 5 being thermally coupled.

In addition, first heat exchanger 4 is thermally coupled to a temperature control chamber 6, and second heat exchanger 5 is thermally coupled to battery 2. In this way, a heat transfer is possible between first heat exchanger 4 and temperature control chamber 6. In addition, in this way a heat transfer is possible between second heat exchanger 5 and battery 2.

Here,
reference character 41 designates a quantity of heat absorbed by first heat exchanger 4, which is in particular transferred from temperature control chamber 6 to first heat exchanger 4,
reference character 42 designates a quantity of heat emitted by first heat exchanger 4, which is in particular transferred from first heat exchanger 4 to temperature control chamber 6,
reference character 51 designates a quantity of heat absorbed by second heat exchanger 5, which is in particular transferred from battery 2 to second heat exchanger 5, and
reference character 52 designates a quantity of heat emitted by second heat exchanger 5, which is in particular transferred from second heat exchanger 5 to battery 2.

In addition, first heat exchanger 4 and second heat exchanger 5 are integrated into a heat pump process, which has, in addition to first heat exchanger 4 and second heat exchanger 5, a compressor (not shown) and an expansion valve (not shown). The heat pump process may operate with a fluid. Heat 41 is for example supplied to first heat exchanger 4 at a low temperature level, which acts to vaporize the fluid, which may be liquid and relieved of stress, at a constant pressure p1. Subsequently, the gaseous fluid is compressed by the compressor (not shown), through the application of mechanical work, in such a way that the fluid has a higher temperature level, compared to the low temperature level, and has a higher pressure p2 compared to pressure p1. Through the emission of heat 52 at the higher temperature level via second heat exchanger 5, the gaseous compressed fluid is again liquefied at constant pressure p2. With recuperation of mechanical work, the expansion valve is used to relieve the liquid fluid of stress in such a way that the liquid, stress-relieved fluid again has pressure p1 at the low temperature level. In this way, it is possible to realize the heat pump as a circuit process. In this way, using the described heat pump process, heat 41 is absorbed at a low temperature level via first heat exchanger 4, and is raised to a higher temperature level, and is emitted as heat 52 via second heat exchanger 5.

In particular, it is possible to reverse the direction of the heat pump so that second heat exchanger 5 absorbs heat 51 at a higher temperature level and first heat exchanger 4 emits heat 42 at a lower temperature level.

Temperature control chamber 6 has a downstream segment 7, a first upstream segment 8, a second upstream segment 9, and a center segment 15. Center segment 15 is adjacent to downstream segment 7, to first upstream segment 8, and to second upstream segment 9. In addition, center segment 15 is situated between first upstream segment 8 and downstream segment 7, and between second upstream segment 9 and downstream segment 7. Also, a direct thermal contact and a direct physical contact exists between center segment 15 and the hatched portion 2.1 of battery 2.

Here, drawn-in separating line 157 delimits center segment 15 from downstream segment 7, drawn-in separating line 158 delimits center segment 15 from first upstream segment 8, and drawn-in separating line 159 delimits center segment 15 from second upstream segment 9. Separating lines 157, 158, 159 provide only an illustration of the delimitation between center segment 15 and downstream segment 7, first upstream segment 8, and second upstream segment 9, and have no further functional significance for temperature control device 1.

Center segment 15 is thermally coupled to downstream segment 7, so that a quantity of heat 152 can be transferred from center segment 15 to downstream segment 7.

In addition, downstream segment 7 is thermally coupled to vehicle interior 3, so that a quantity of heat 72 can be transferred from downstream segment 7 to vehicle interior 3.

First upstream segment 8 is thermally coupled to vehicle interior 3, so that a quantity of heat 81 can be transferred from vehicle interior 3 to first upstream segment 8.

Second upstream segment 9 is thermally coupled to a vehicle surrounding environment 10, so that a quantity of heat 91 can be transferred from vehicle surrounding environment 10 to second upstream segment 9.

In addition, center segment 15 of temperature control chamber 6 can be thermally coupled in alternating fashion to first upstream segment 8 or to second upstream segment 9. FIG. 1 shows that temperature control chamber 6 advantageously has a regulating element 11 for this purpose.

When regulating element 11 is configured in a first position 111, shown in solid lines in FIG. 1, center segment 15 is thermally coupled to first upstream segment 8. In this way, a quantity of heat 82 can be transferred from first upstream segment 8 to center segment 15.

When regulating element 11 is configured in a second position 112, shown in broken lines in FIG. 1, center segment 15 is thermally coupled to second upstream segment 9. Thus, a quantity of heat 92 can be transferred from second upstream segment 9 to center segment 15.

As is shown in FIG. 1, first heat exchanger 4 may be coupled to center segment 15 of temperature control chamber 6. Thus, heat 41 can be transferred from center segment 15 of temperature control chamber 6 to first heat exchanger 4. In addition, in this way heat 42 can be transferred from first heat exchanger 4 in particular to center segment 15 of temperature control chamber 6. Here, first heat exchanger 4 may be situated in the interior of center segment 15 of temperature control chamber 6, or is situated so as to be in thermal contact with center segment 15 of temperature control chamber 6.

In addition, temperature control chamber 6, in particular second upstream segment 9, can have at least one heating element 12. Here, as shown in FIG. 1, the at least one heating element 12 can use fossil fuels. Alternatively, heating element 12 can be fashioned as an electrical heating element. The at least one heating element 12 is used to bring an additional quantity of heat 121 into temperature control chamber 6, in particular into second upstream segment 9.

To control the temperature of battery 2 or of vehicle interior 3, the first heat exchanger 4 is coupled thermally, in particular via center segment 15 of temperature control chamber 6, to first upstream segment 8, in particular through a configuration of regulating element 11 in first position 111, or is thermally coupled to second upstream segment 9, in particular through a configuration of regulating element 11 in a second position 112.

If first heat exchanger 4 is coupled thermally, in particular via center segment 15 of temperature control chamber 6, to first upstream segment 8, in particular through a configuration of regulating element 11 in first position 111, then, as is seen in FIG. 1, in a first operating mode of temperature control device 1 heat can be transferred from vehicle interior 3 to battery 2 by transferring heat 81, heat 82, heat 41, and heat 52. In this way, vehicle interior 3 is cooled by removal of heat. In addition, battery 2 can be heated in this way.

In addition, as can be seen in FIG. 1, in a second operating mode of temperature control device 1 heat can be transferred from vehicle surrounding environment 10 to battery 2 through transfer of heat 91, heat 92, heat 41, and heat 52, if first heat exchanger 4 is thermally coupled, in particular via center segment 15 of temperature control chamber 6, to second upstream segment 9, in particular through a configuration of regulating element 11 in second position 112. In this way, battery 2 can be heated by a supply of heat. In addition, the at least one heating element 12 can support the heating of battery 2 through a supply of heat 121.

In addition, as can be seen in FIG. 1, in a third operating mode of the temperature control device heat can be transferred from battery 2 to vehicle interior 3 by transferring heat 51, heat 42, heat 152, and heat 72. Here, first heat exchanger 4 may be thermally coupled, in particular via center segment 15 of temperature control chamber 6, to first upstream segment 8. In this way, vehicle interior 3 can be heated by waste heat from battery 2.

According to the present invention, in temperature control device 1 first heat exchanger 4 can be thermally coupled alternately to first upstream segment 8 or to second upstream segment 9. Thus, using temperature control device 1 it is possible to change over between the first operating mode, the second operating mode, and the third operating mode, in particular through a configuration of regulating element 11 in first position 111 or in second position 112, in such a way that a desired temperature controlling of battery 2 and/or of vehicle interior 3 is achieved. Here, the first operating mode is used for a cooling of vehicle interior 3 and a possible heating of battery 2, the second operating mode is used for a heating of battery 2, and the third operating mode is used for a heating of vehicle interior 3.

The transfers of heat based on the described thermal coupling, and the transfers of heat within a segment of temperature control chamber 6, may be based on a thermal conduction based on temperature gradients and/or on a convective heat transfer based on the flow of a fluid and of temperature gradients.

It is possible for temperature control chamber 6 to be such that a medium can flow through it. In addition, it is advantageous if temperature control chamber 6 additionally has a conveyor unit 13 used to convey the medium.

The medium flowing through temperature control chamber 6 flows through temperature control chamber 6, in particular from first upstream segment 8 via center segment 15 in the direction of downstream segment 7 or from second upstream segment 9 via center segment 15 in the direction of downstream segment 7, in such a way that the medium can be used for a transfer of quantities of heat 41, 42, 72, 81, 82, 91, 92, 157, 121 through a convective heat transfer, or can support this heat transfer through a convective heat transfer.

In particular, temperature control chamber 6 can have a thermally conductive material, for example a plastic or a metal, that is used for a heat transfer of at least one of the quantities of heat 41, 42, 72, 81, 82, 91, 92, 121, 152 through heat conduction, or supports this heat transfer through heat conduction.

It is particularly advantageous if air can flow from vehicle interior 3 via first upstream segment 8 and via center segment 15 in the direction of downstream segment 7, and can flow from downstream segment 7 back into vehicle interior 3. Advantageously, here a blower unit 14 is used to convey the air stream. Here, regulating element 11 may be configured in first position 111. In this way, the air flowing through temperature control chamber 6 during the first operating mode of temperature control device 1 can emit heat to first heat exchanger 4 in order to cool vehicle interior 3, and, cooled, can flow back into vehicle interior 3. Or, during the third operating mode of temperature control device 1, in order to heat vehicle interior 3 the air can absorb heat from first heat exchanger 4 and, thus heated, can flow back into vehicle interior 3.

In addition, it is advantageous if air can flow from vehicle surrounding environment 10 via second upstream segment 9 and via center segment 15 in the direction of downstream segment 7. Here, regulating element 11 may be configured in second position 112. In this way, during the second operating mode the air can emit heat from vehicle surrounding environment 10 to first heat exchanger 4, which heat can thus heat battery 2.

In addition, it is possible to situate temperature control device 1, in particular first heat exchanger 4, on a floor area and/or on a wall area of the vehicle in the vicinity of which batteries are situated. In this way, the floor area and/or the wall area can advantageously be cooled.

The temperature control device can be used in electric vehicles having accumulators, in particular having lithium-ion batteries, for example having lithium-sulfur batteries or lithium-air batteries, which are operated at a temperature in a temperature range of from 60° C. to 120° C., and which may be at a temperature in a temperature range of from 65° to 100° C., and in particular at a temperature of 80° C.

In addition to its use in vehicles, a use of temperature control device 1 according to the present invention as a stationary temperature control device is also possible, such as in particular for controlling the temperature of buildings.

What is claimed is:

1. A temperature control device for a battery and for a vehicle interior, comprising:
    a first heat exchanger; and
    a second heat exchanger, the first heat exchanger and the second heat exchanger being thermally coupled, the second heat exchanger being thermally coupled to the battery, and the first heat exchanger to a temperature control chamber that has a downstream segment that is thermally coupled to the vehicle interior and has a first upstream segment and a second upstream segment, the first upstream segment being thermally coupled to the vehicle interior and the second upstream segment to a surrounding environment of the vehicle, the first heat exchanger being capable of being thermally coupled alternately to one of the first upstream segment and the second upstream segment, and wherein the temperature control chamber includes a center segment that includes a wall in direct thermal contact and direct physical contact with the battery.

2. The temperature control device of claim 1, wherein the temperature control chamber has a regulating element configured so that in a first position of the regulating element the first heat exchanger is thermally coupled to the first upstream segment, and in a second position of the regulating element the first heat exchanger is thermally coupled to the second upstream segment of the temperature control chamber.

3. The temperature control device of claim 1, wherein the temperature control chamber has at least one heating element.

4. The temperature control device of claim 1, wherein a medium can flow through the temperature control chamber via the first upstream segment in the direction of the downstream segment, or air from the surrounding environment of the vehicle can flow through the temperature control chamber via the second upstream segment in the direction of the downstream segment.

5. The temperature control device of claim 4, wherein the temperature control chamber has a conveyor unit that is configured so that the medium flows through the temperature control chamber.

6. A method for controlling the temperature of a battery and of a vehicle interior, the method comprising:
    thermally coupling a first heat exchanger of a temperature control device to a first upstream segment or to a second upstream segment of the temperature control device;
    wherein the temperature control device, includes:
        the first heat exchanger; and
        a second heat exchanger, the first heat exchanger and the second heat exchanger being thermally coupled, the second heat exchanger being thermally coupled to the battery, and the first heat exchanger to a temperature control chamber that has a downstream segment that is thermally coupled to the vehicle interior and has the first upstream segment and the second upstream segment, the first upstream segment being thermally coupled to the vehicle interior and the second upstream segment to a surrounding environment of the vehicle, the first heat exchanger being capable of being thermally coupled alternately to one of the first upstream segment and the second upstream segment; and
    implementing a direct thermal contact and a direct physical contact between the battery and a wall of a center segment of the temperature control chamber.

7. The method of claim 6, wherein the first heat exchanger is thermally coupled to the first upstream segment, and the second heat exchanger emits heat in such a way that the vehicle interior is cooled, wherein the second heat exchanger emits heat based on a thermal conduction based on at least one of a temperature gradient and a convective heat transfer based on a flow of a fluid.

8. The method of claim 6, wherein the first heat exchanger is thermally coupled to the second upstream segment, and the second heat exchanger emits heat in such a way that the battery is heated, wherein the second heat exchanger emits heat based on a thermal conduction based on at least one of a temperature gradient and a convective heat transfer based on a flow of a fluid.

9. The method of claim 6, wherein the first heat exchanger is thermally coupled to the first upstream segment, and the second heat exchanger absorbs heat in such a way that the vehicle interior is heated, wherein the second heat exchanger absorbs heat based on a thermal conduction based on at least one of a temperature gradient and a convective heat transfer based on a flow of a fluid.

10. The method of claim 6, wherein the battery is operated at a temperature in a temperature range of from 60° C. to 120° C.

11. The method of claim 6, wherein the battery is operated at a temperature in a temperature range of from 65° C. to 100° C.

12. The temperature control device of claim 1, wherein the battery is operated at a temperature in a temperature range of from 60° C. to 120° C.

13. The temperature control device of claim 1, The method of claim 6, wherein the battery is operated at a temperature in a temperature range of from 65° C. to 100° C.

14. The temperature control device of claim 1, wherein the temperature control chamber, in particular the second upstream segment, has at least one heating element.

15. The temperature control device of claim 1, wherein a medium, in particular air from the vehicle interior, can flow through the temperature control chamber via the first upstream segment in the direction of the downstream segment, or air from the surrounding environment of the vehicle can flow through the temperature control chamber via the second upstream segment in the direction of the downstream segment.

16. The temperature control device of claim 4, wherein the temperature control chamber has a conveyor unit, in particular a blower unit, that is configured so that the medium flows through the temperature control chamber.

* * * * *